Dec. 18, 1934.  S. COHEN  1,984,464
MOUNTING FOR ROTOR SHAFT OF VARIABLE CONDENSERS
Filed March 2, 1933
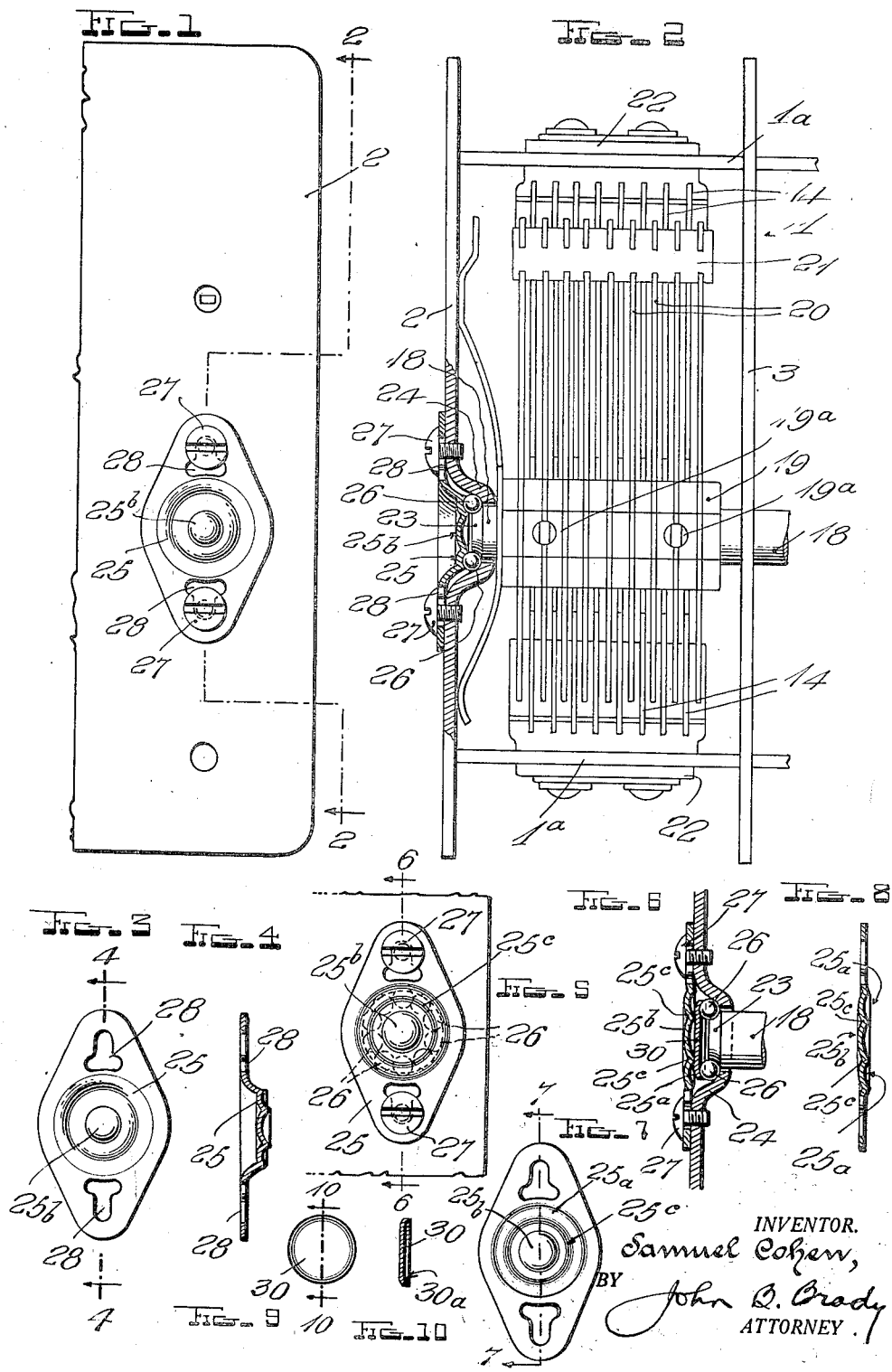
INVENTOR.
Samuel Cohen,
BY
John D. Brody
ATTORNEY.

Patented Dec. 18, 1934

1,984,464

UNITED STATES PATENT OFFICE 1,984,464

MOUNTING FOR ROTOR SHAFT OF VARIABLE CONDENSER

Samuel Cohen, Brooklyn, N. Y., assignor to General Instrument Corporation, New York, N. Y., a corporation of New York Application March 2, 1933, Serial No. 659,406

8 Claims. (Cl. 308—233)

My invention relates broadly to variable condensers and more particularly to a construction of mounting means for the rotatable shaft of a variable condenser.

This application is a continuation in part of my copending application No. 541,466, filed June 1, 1931, for Variable condensers.

One of the objects of my invention is to provide a construction of ball bearing race for journalling the end of the rotatable shaft of a variable condenser and maintaining the shaft in alignment with the ball bearings, at the same time providing means for readily lubricating the ball bearings.

Another object of my invention is to provide a construction of bearing plate for the rotatable shaft of a multiple variable condenser having means for excluding dust and foreign matter from the bearing while permitting lubrication of the bearing from time to time.

Still another object of my invention is to provide a construction of yieldable ball bearing plate for the journal of a rotary shaft in a variable condenser by which the ball bearings in a ball race about the rotatable shaft are confined in a predetermined annular path.

A further object of my invention is to provide a construction of cap member adapted to coact with the end of a rotary shaft in a variable condenser wherein the cap member has a centrally depressed circular portion and an annular depressed concentric portion for guiding ball bearings disposed in a ball race about the ends of a condenser shaft.

A still further object of my invention is to provide a construction of yieldable end plate for the journal of a rotary shaft of a variable condenser in which the plate has means for resiliently maintaining a guide member for ball bearings in pre-arranged relation to the end of a rotary shaft for guiding the ball bearings in an annular path about the end of the rotary shaft.

Other and further objects of my invention reside in the construction of journal and end plate for a rotary variable condenser shaft as set forth more fully in the specification hereinafter following by reference to the accompanying drawing, in which:

Figure 1 is an elevational view showing the end of a variable condenser and illustrating the cap member of my invention secured in position thereon in alignment with the rotary shaft of the variable condenser; Fig. 2 is a cross sectional view taken through the cap member of my invention shown in position with respect to the journal of the rotary shaft of a multiple variable condenser, the view being taken on line 2—2 of Fig. 1; Fig. 3 is an elevational view of the cap member of my invention; Fig. 4 is a vertical sectional view taken through the cap member of my invention on line 4—4 of Fig. 3; Fig. 5 is an elevational view of a modified form of cap member of my invention showing the ball race which is maintained in position by the cap member, the balls in the ball race being illustrated by dotted lines; Fig. 6 is a vertical sectional view taken on line 6—6 of Fig. 5; Fig. 7 is a plan view of the modified form of end cap shown in Fig. 6; Fig. 8 is a cross sectional view taken through the modified form of end cap illustrated in Figs. 6 and 7, the view being taken on line 7—7 of Fig. 7; and Figs. 9 and 10 are elevational and sectional views respectively of a guide plate which may be maintained in position in the journal of the variable condenser for confining the ball bearings in an annular path in the journal at the end of the rotary variable condenser shaft.

My invention is directed to the construction of the ball bearing race for journaling the end of the rotary shaft of a variable condenser and wherein the ball bearings are maintained in a predetermined annular path by reason of the resiliency of the end cap which is exerted against the ball bearings in the course of the rotary movement of the variable condenser shaft. The cap member may have a centrally depressed circular portion and an annularly depressed concentric portion, which portions may be resiliently sprung toward the end of the rotary condenser shaft and provide means for maintaining the ball bearings around the end of the shaft in a pre-arranged annular path. In another form of my invention the cap member may bear directly against a guide plate which in turn bears against the end of the rotary shaft and against the ball bearings in which the shaft is mounted for guiding the ball bearings in a pre-arranged annular path. I provide oppositely arranged T-shaped slots in the cap member which permit adjustment of the cap member in a position with respect to the end of the rotary shaft while allowing lubrication of the shaft from time to time. I have found that the structure of my invention provides an extremely accurate method of journaling the rotary shaft of a variable condenser allowing adjustment of the shaft without wobbling or disalignment of the rotor and stator plates.

Referring to the drawing in detail, reference character 1 designates a condenser chassis having laterally extending plate members 2, 3 etc.

forming electrostatic shields between the condenser plates in a multiple condenser system. The condenser chassis is provided with side wall portions 1a, which support insulated panel members 22, connected at the lower edge thereof to the sides 1a of the condenser chassis as illustrated. The panels 22 extend upwardly adjacent the sides 1a of the chassis 1 and provide insulated supports for the sets of stator plates 14.

The rotor plates 20 which are interleaved with the stator plates 14 are carried on a sleeve member 19 which is secured by means of screw members 19a to rotatable shaft 18. The rotor plates 20 are maintained in predetermined spaced relation by key member 21. The shaft 18 is tapered at the end thereof at 23 and projects through the housing 24 in plate member 2 and is journaled therein by means of ball bearings 26. The ball bearings are confined within the housing 24 in a raceway defined by the end cap member 25 shown more clearly in Figs. 3, 4 and 5. The cap member 25 is apertured by means of T-shaped slots 28 adjacent opposite ends of the plate, which slots are engaged by screws 27 for adjustably mounting the plate member 25 with respect to the end plate 2 of the condenser chassis. The cap member 25 has an annular raceway 25a pressed therein and a central projecting portion 25b pressed therein as shown, whereby the balls 26 are confined in their path of travel around the shaft 18 and the entire ball bearing race protected from dust and other foreign matter. Cap member 25 not only retains balls 26 in the ball race 24, but by virtue of the T-shaped slot will adjust itself automatically to any inaccuracy in manufacturing and wear, and furthermore these slots serve as a path for oil, lubricating the ball bearings. It will also be noted that, after tightening the fastening screws 27, the inherent tendency of the thin retaining plate to press inwardly will tend to positively center the balls within their ball race and since they co-act with the cone shaped end of shaft 18 will keep the shaft from wobbling and thus prevent disastrous disalignment of rotor and stator. Attention is also called to the fact that since the portion 25b is bowed outwardly, end thrust exerted by the shaft must spring this portion of the cap outwardly towards a flattened condition in order to force the cap away from the end plate of the frame and, therefore, added resiliency will be imparted to the cap and the bearing balls held in proper engagement with the shaft and race and the shaft prevented from moving lengthwise. Therefore, there will be no danger of the rotor plates moving out of their proper spaced relation to the stator plates of the condenser units.

In Fig. 5 I have shown a modified form of my invention in which the cap member is provided with an annular rib 25c which bears against a guide plate 30 which in turn forms a guideway for the balls 26. By virtue of the inherent resiliency of the cap member with the rib 25c therein, the balls 26 are pressed uniformly about the cone shaped end 23 of the rotary shaft through the agency of the guide plate 30. In this arrangement, the circular guide plate 30 is disposed between the annular rib 25c in cap member 25 and the balls 26 which operate with respect to the tapered end 23 of rotary shaft 18. The fact that the central portion of the cap is bowed outwardly imparts added resiliency to the cap to resist end thrust of the shaft 18 and since the annular rib 25c has contact with the plate 30 along a circular line parallel to the periphery of the plate, pressure will be concentrated along this line and there will be no danger of the plate being forced inwardly out of a flattened condition as would be the case if the pressure were applied at the center of the plate. It should be also noted that the annular rib will, to a certain extent, have a tendency to bite into the plate and very securely hold the plate against slipping out of its proper position. As shown in Figs. 9 and 10, the circular guide plate 30 has its peripheral edge slightly curved at 30a to conform with the balls 26 which operate in a circular path about the end of shaft 18. The cap member 25 has the annular portion or rib 25c intermediate the central projecting portion 25b and the annular portion 25a therein constantly pressing against the guide plate 30 in order to urge said guide plate against the ball bearings 26.

The construction of bearing of my invention has proven highly practical in variable condensers manufactured on a quantity production basis and where it is necessary to provide an effective and yet inexpensive form of precision mounting for the rotary shaft of such condensers. However, while I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. A mounting for a rotatable shaft comprising a plate formed with an opening and a cup about the opening constituting a ball race open at its outer end, a shaft having an end extending through said opening into said cup, and a cap extending across the open outer end of said cup with its ends fitting against the outer face of said plate, a pair of T-shaped slots being formed in the ends of said cap member, screw means extending through said slots and engaging said plate for maintaining said cap member in position, said cap having a depressed central portion aligned with the end of said rotatable shaft and an annular depressed portion defining the rotatable path of ball bearings in said ball race around said shaft and a path for lubricant extending from the T-shaped slots in said cap member to said ball race.

2. A mounting for a rotatable shaft comprising an annular housing, a shaft having a tapered end extending into said housing, ball bearings disposed between the tapered end of said shaft and the interior wall of said annular housing, and a cap member constituted by a resilient metal stamping secured to the said housing, said metal stamping having an annular recess formed therein, and a central depression therein separated from the annular recess by an intermediate annular rib, a circular guide member extending diametrically across the end of said tapered shaft with the edge thereof shaped to confine the said ball bearings in an annular path about the tapered end of said shaft, the annular rib on said metal stamping contacting in an annular path with the circular guide member for yieldably pressing said circular guide member against the said ball bearings in a path around the tapered end of said shaft.

3. In a mounting for a rotatable shaft, an annular housing, a shaft having a tapered end projecting into said housing, a yieldable cap member constituted by a resilient metallic stamping closing the end of said housing, an annular inwardly extending rib formed in said yieldable cap member, a circular plate member rolled over at its periphery to provide means for confining the said ball bearings in an annular path about the tapered end of said shaft, the inwardly extending rib on said cap member continuously abutting said circular plate in an annular path for resiliently pressing said circular plate toward said ball bearings in a path around the tapered end of said shaft.

4. In a mounting for a rotary shaft, a plate formed with an opening and a cup-shaped race about the opening, a shaft extending through said opening, antifriction members in said race engaging said shaft, a cap for said race having a portion extending into the race in spaced relation to walls thereof and engaging the antifriction members to hold the same in engagement with said shaft, said cap having portions fitting against said plate and formed with fastener receiving openings, and fasteners comprising headed screws, screw threaded into said plate and engaged through the openings of said cap to retain the cap in place, the openings of the cap having portions extending beyond the limits of the headed screws and communicating with the space between the walls of the race and the inwardly extending portion of the cap whereby oil may be delivered to said antifriction members.

5. In a mounting for a rotary shaft, a support, a bearing cup carried thereby and formed with a center opening, a shaft extending through the opening into said cup, bearing balls in said cup about said shaft, a cap for said cup having means for retaining the bearing balls in place about said shaft, portions of said cap overlapping the support beyond margins of said cup and being formed with fastener receiving openings, and fasteners having laterally extending heads thereon, said fastener being engaged through the fastener receiving openings to secure said cap in place, said fastener receiving openings having portions extending beyond the limits of the laterally extending heads and opening into said cup whereby oil may be injected into the cup through the openings to lubricate the bearing balls.

6. A mounting for a rotary shaft including a cup-shaped race, bearing balls in said race, a cap for said race formed with fastener receiving openings having exposed portions overlapping the race and opening into the race, screw devices having securing heads abutting the fastener receiving openings but terminating short of the exposed portions overlapping the race, whereby oil may be injected into the race through the overlapping portions of the openings adjacent the securing heads of said screw devices to lubricate the bearing balls.

7. In a mounting for a rotary shaft, a frame having an end plate formed with an opening and a ball race about the opening, a rotatable shaft extending through said frame and having a tapered end journaled in the opening of the end plate, and a cap formed of resilient sheet metal and having a portion extending into the ball race and terminating in a head having an outwardly bowed annular portion surrounding an outwardly bowed central portion, the central portion of the head being aligned with said shaft and imparting added resiliency to the cap and the annular portion being arranged to resiliently confine movement of bearing balls within the ball race about the tapered end of said shaft, and means for attaching said cap to said end plate, said means including screw devices extending through said cap with heads thereon projecting to positions adjacent the ball race.

8. A mounting for a rotatable shaft comprising a plate formed with an opening and a cup about the opening constituting a ball race open at its outer end, a shaft having an end extending through said opening into said cup, and a cap extending across the open outer end of said cup with its ends fitting against the outer face of said plate, a pair of slots being formed in the ends of said cap member, screw means extending through said slots and engaging said plate for maintaining said cap member in position, said cap having a depressed central portion aligned with the end of said rotatable shaft and an annular depressed portion defining the rotatable path of ball bearings in said ball race around said shaft and a path for lubricant extending from the slots in said cap member to said ball race.

SAMUEL COHEN.